United States Patent
Engel et al.

(10) Patent No.: US 10,508,727 B2
(45) Date of Patent: Dec. 17, 2019

(54) DRIVE SYSTEM AND DRIVE SUB-ASSEMBLY FOR DRIVING A SHAFT

(71) Applicant: SPX FLOW, INC., Charlotte, NC (US)

(72) Inventors: Dave Engel, Springwater, NY (US); Richard Adams, Rochester, NY (US)

(73) Assignee: SPX Flow, Inc., Charlotte, NC (US)

( * ) Notice: Subject to any disclaimer, the term of this patent is extended or adjusted under 35 U.S.C. 154(b) by 461 days.

(21) Appl. No.: 15/253,131

(22) Filed: Aug. 31, 2016

(65) Prior Publication Data

US 2018/0058567 A1    Mar. 1, 2018

(51) Int. Cl.

| | |
|---|---|
| *F16H 57/00* | (2012.01) |
| *B01F 7/00* | (2006.01) |
| *B01F 15/00* | (2006.01) |
| *F16H 1/02* | (2006.01) |
| *F16H 55/17* | (2006.01) |
| *F16H 57/02* | (2012.01) |
| *F16H 57/04* | (2010.01) |
| *F16C 35/073* | (2006.01) |
| *F16C 23/06* | (2006.01) |
| *F16C 25/06* | (2006.01) |
| *F16H 57/021* | (2012.01) |
| *F16C 19/38* | (2006.01) |
| *F16C 33/58* | (2006.01) |

(52) U.S. Cl.
CPC ..... *F16H 57/0025* (2013.01); *B01F 7/00725* (2013.01); *B01F 15/00487* (2013.01); *F16C 23/06* (2013.01); *F16C 25/06* (2013.01); *F16C 35/073* (2013.01); *F16H 1/02* (2013.01); *F16H 55/17* (2013.01); *F16H 57/02* (2013.01); *F16H 57/021* (2013.01); *F16H 57/0471* (2013.01); *B01F 15/00435* (2013.01); *F16C 19/385* (2013.01); *F16C 33/581* (2013.01); *F16C 2361/61* (2013.01)

(58) Field of Classification Search
CPC . F16H 57/021; F16H 57/0025; F16H 57/0031
See application file for complete search history.

(56) References Cited

U.S. PATENT DOCUMENTS

| | | | | |
|---|---|---|---|---|
| 4,025,136 A | * | 5/1977 | Ballendux | B60K 17/28 384/583 |
| 4,412,705 A | * | 11/1983 | Schreiner | F16C 35/077 384/584 |
| 5,211,488 A | * | 5/1993 | Patz | F16C 35/073 384/584 |

(Continued)

FOREIGN PATENT DOCUMENTS

| | | |
|---|---|---|
| DE | 7736479 U1 | 3/1978 |
| JP | 2004-239320 A | 8/2004 |

*Primary Examiner* — Howard J Sanders
*Assistant Examiner* — Gregory T Prather
(74) *Attorney, Agent, or Firm* — BakerHostetler (57) ABSTRACT

A drive sub-assembly includes a hub extending from a first end face to a second end face along a longitudinal axis. The hub may have an outer circumferential surface arranged to engage a first bearing assembly and an inner circumferential surface arranged to engage an output shaft. The drive sub-assembly further includes a gear attached to the second end face of the hub. The gear may have a second inner circumferential surface that is arranged to directly engage a second bearing assembly.

6 Claims, 6 Drawing Sheets

(56) References Cited

U.S. PATENT DOCUMENTS

| | | | | |
|---|---|---|---|---|
| 6,058,793 | A * | 5/2000 | Pasley | F16H 1/20 |
| | | | | 184/6.12 |
| 8,641,574 | B2 * | 2/2014 | Janson | F16H 57/0031 |
| | | | | 475/220 |
| 8,702,553 | B2 * | 4/2014 | Janson | F16C 35/077 |
| | | | | 475/220 |
| 2002/0033060 | A1 * | 3/2002 | Dorrie | F16C 19/48 |
| | | | | 74/333 |
| 2003/0167869 | A1 * | 9/2003 | Burgman | F16C 19/381 |
| | | | | 74/412 R |
| 2008/0156130 | A1 * | 7/2008 | Vassaux | F16D 9/06 |
| | | | | 74/412 TA |
| 2008/0188343 | A1 * | 8/2008 | Pan | F16H 48/08 |
| | | | | 475/230 |
| 2012/0220417 | A1 * | 8/2012 | Janson | F16H 57/0031 |
| | | | | 475/229 |
| 2013/0276566 | A1 * | 10/2013 | Biermann | F16H 57/021 |
| | | | | 74/413 |
| 2013/0345009 | A1 * | 12/2013 | Iwasa | B60K 6/365 |
| | | | | 475/5 |
| 2014/0224053 | A1 * | 8/2014 | Buchleitner | F16H 55/17 |
| | | | | 74/445 |
| 2014/0364277 | A1 * | 12/2014 | Takagi | F16H 57/0025 |
| | | | | 477/108 |
| 2016/0033026 | A1 * | 2/2016 | Tsukahara | F16H 57/0031 |
| | | | | 74/434 |
| 2017/0122214 | A1 * | 5/2017 | Morelli | F01D 25/16 |
| 2017/0350498 | A1 * | 12/2017 | Muto | F16H 57/04 |

* cited by examiner

FIG. 6

DRIVE SYSTEM AND DRIVE SUB-ASSEMBLY FOR DRIVING A SHAFT

TECHNICAL FIELD

The present invention relates generally to apparatuses and methods that provide bearing support to a driven shaft that may include an impeller or other device for agitating fluid and may be employed in a mixer or mixing system.

BACKGROUND

In material processing equipment such as mixers or mixing systems, it is common that a rotatable shaft assembly is supported by spherical and/or tapered bearing assemblies. This support is commonly accomplished by placing the bearing assemblies at various axial locations along the rotatable shaft. In particular, a mixing system may include an output impeller drive shaft that extends into a mixing vessel to drive an impeller and a hollow shaft that may encircle a portion of the output shaft. The hollow shaft may be rotationally coupled to the output shaft, and have a gear that is driven to transmit rotational motion to the hollow shaft. A first bearing or bearing set may be employed to support the output shaft, while a second bearing or bearing set may be utilized to support the hollow shaft.

The output shaft may be subject to high load and bending forces due to various mixing conditions during operation of a mixing system. These conditions may include, for example, shaft speed, physical properties of materials to be mixed, and shaft length. These forces may translate into bending forces that may cause the output shaft to deflect radially. The first and second bearings or bearing sets may isolate the hollow shaft from the output shaft and the associated bending loads the output shaft experiences. This may prevent the likelihood of the hollow shaft from transmitting undesirable loads to other components of the mixing system.

However, the second bearing or bearing set may be separated radially and/or axially from the gear by a portion of, or a separate component attached to a portion of, the hollow shaft which is surrounded by the second bearing or bearing set. As such, the rotation of the gear which is transferred to the hollow shaft and thereby the output shaft, is not directly supported by either of the first or second bearings or bearing sets. In addition, each of the first and second bearings or bearing sets may require a respective type of lubricant, for example oil for one bearing and grease for another bearing, to operate. This may require multiple lubricant sources and delivery mechanisms.

The mixing system may also include a frame assembly and bearing housings (e.g. bearing caps) mounted on the frame assembly which house each of the first and second bearings or bearing sets. The bearing housings include multiple components and may be mounted in such a way that bearing bores of respective bearings are not accurately aligned with one another. This can result in misalignment between the output shaft and the hollow shaft.

In view of the foregoing, there is a need for an arrangement of bearings which permits for multiple bearings to be lubricated by the same lubricant. In addition, there is a need for an apparatus and a method that improves bearing accuracy and performance while reducing a total number of parts required to transmit motion of a gear to a driven shaft.

These and other needs are addressed by the present disclosure.

SUMMARY OF THE DISCLOSURE

According to an aspect of the present disclosure, a drive sub-assembly is provided and may include a hub extending from a first end face to a second end face along a longitudinal axis. The hub may have an outer circumferential surface arranged to engage a first bearing assembly and an inner circumferential surface arranged to engage an output shaft. The drive sub-assembly further includes a gear attached to the second end face of the hub. The gear may have a second inner circumferential surface that is arranged to directly engage a second bearing assembly.

According to an aspect of the present disclosure, a drive system for a mixing apparatus may transmits a rotational movement of an input shaft to an output shaft of the mixing apparatus and include a housing having a first housing and a second housing. The first housing may be arranged to receive the input shaft, and the second housing may include a cylindrical wall that extends from the second housing towards the first housing and is arranged to receive the output shaft. The drive system may further include a hub mounted on the cylindrical wall, and a gear attached to the hub and configured to transmit the rotational movement of the input shaft to the hub. The drive system may include a first bearing assembly operatively positioned between the hub and the first housing, and a second bearing assembly operatively positioned on the cylindrical wall and the gear. According to an aspect of the present disclosure, the cylindrical wall and the hub may define a gap arranged to contain fluid for lubricating the second bearing assembly, and the cylindrical wall may extend between the gap and the output shaft to prevent the fluid from contacting the output shaft.

According to still another aspect of the present disclosure, a method for driving an output shaft may include applying a force to a gear causing a rotational movement of a hub, and engaging the output shaft with the hub causing a rotational movement of the output shaft corresponding to the rotational movement of the hub. A first bearing assembly is mounted on the hub, and the gear may be attached to the hub and directly engage a second bearing assembly.

DETAILED DESCRIPTION

It is noted that as used herein the specification and the appending claims the singular forms "a," "an," and "the" can include plural references unless the context clearly dictates otherwise. Further, unless specified otherwise, the terms "substantial" or "substantially" as used herein mean "considerable in extent," or "largely but not necessarily wholly that which is specified." Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The present disclosure is directed to a drive system for a mixing apparatus including a output shaft that is driven to rotate according to a rotational motion of a drive sub-assembly. The drive sub-assembly includes an output gear attached to a hub, and a rotational motion of the output gear is transmitted to the output shaft via an engagement between the hub and the output shaft. The drive sub-assembly is supported for rotation by first and second bearing assemblies. As described in more detail below, the drive system includes a shaft housing that defines a barrier (e.g. a drywell, oil dam, etc.). The barrier defined by the shaft housing extends through the second bearing assembly and a portion of the hub to enable lubrication of the first and second bearing assemblies with a same fluid. In particular, the barrier is arranged to allow the fluid to be present within the drive sub-assembly and lubricate the second bearing assembly, but prevent the fluid from coming in contact with the output shaft.

The hub is attached to the output gear, and the output gear may be directly engaged with the second bearing assembly. The direct engagement advantageously provides a minimal number of interfaces between the output gear and a bearing assembly that facilitates the rotational motion of the output gear. More specifically, there is a minimal number of interfaces from which forces may be transmitted and generate loads on the output gear that may affect the output gear's rotational motion. As a result, the accuracy of the rotational motion of the output gear of the present disclosure may be improved as compared to other arrangements having multiple interfaces between a gear and a bearing assembly. In addition, the output gear may contribute to setting the second bearing assembly and effectively function as a bearing cap without a complicated arrangement of components typical of bearing caps, and thereby reduce a total number of parts needed to provide the drive system of the present disclosure. The reduced number of parts may improve assembly times since there are fewer parts to assemble, and may improve overall efficiency of operation and operating life since there are fewer parts that may fail with continued use.

Figure 1:
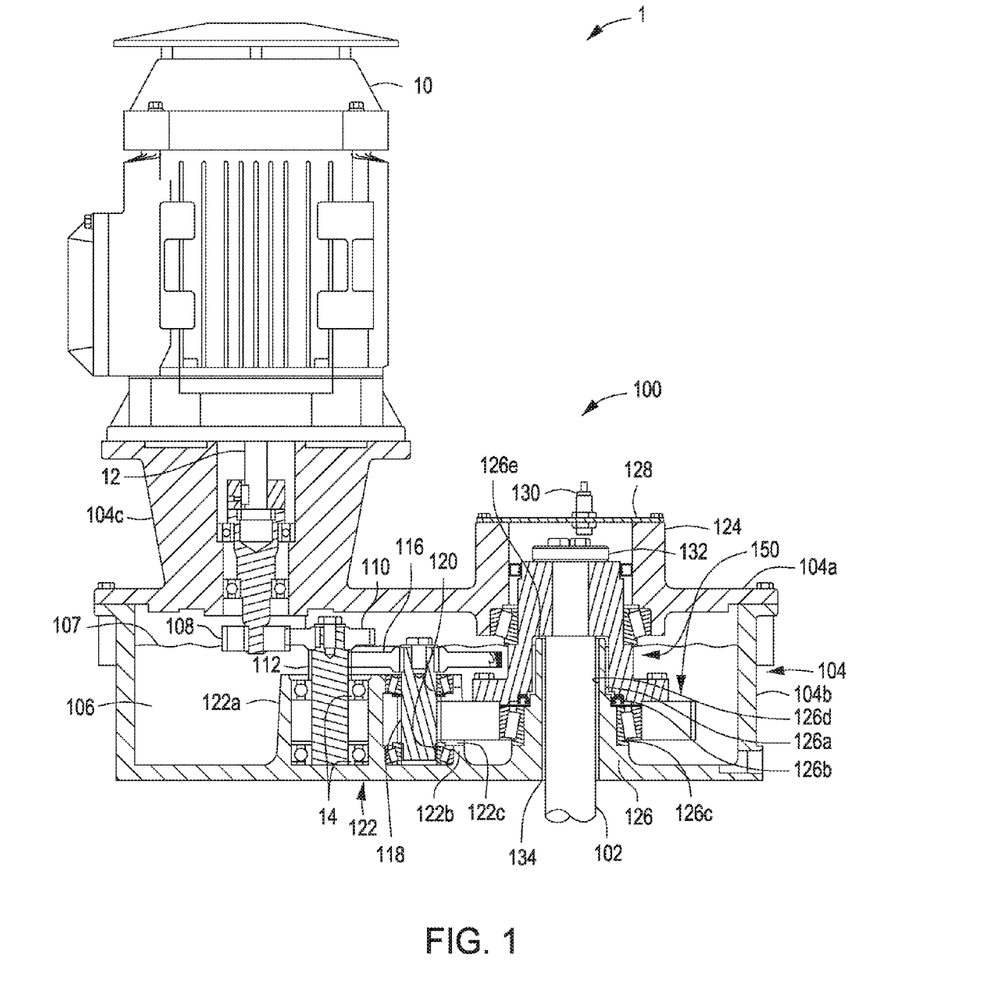
FIG. 1 illustrates a motor and a cross-sectional view of a drive system of a mixing apparatus, according to an aspect of the present disclosure.

FIG. 1 illustrates a motor 10 and a cross-sectional view of a drive system 100 of a mixing apparatus 1, according to an aspect of the present disclosure. The drive system 100 transmits the rotational movement of an input shaft 12 driven by the motor 10 to an output shaft 102 of the drive system 100. The output shaft 102 may extend through a housing assembly 104 of the drive system 100 and into a container or other vessel (not shown). An impeller, blade, or other component (not shown) may be fixedly attached to at an end of the output shaft and configured to mix fluids within the container with the rotation of the output shaft 102.

The housing assembly 104 includes a first housing 104a mounted on and attached to a second housing 104b, and a flange 104c which extends from the first housing 104a to support the motor 10. The flange 104c receives the input shaft 12. The first housing 104a may be removably attached to the second housing 104b by a plurality of bolts secured by nuts or received in threaded bores formed around a periphery of the first housing 104a and the second housing 104b, or other fasteners known in the art. An operating chamber 106 is defined between the first housing 104a and second housing 104b and receives an input pinion shaft 108 that is engaged with the input shaft 12 and extends through a portion of the flange 104c of the first housing 104a. The operating chamber 106 may be at least partially filled with a fluid 107 (e.g. a lubricating fluid such as oil) for lubricating the components of the drive system 100 positioned within the housing 104.

The input pinion shaft 108 is engaged with a first intermediate gear 110 that is fixedly attached to an end of a first intermediate pinion shaft 112. The first intermediate pinion shaft 112 is aligned and supported for rotation by first intermediate bearing assemblies 114. The first bearing assemblies 114 may include a combination of ball bearings, needle roller bearings, or the like. Rotation of the first intermediate pinion shaft 112 causes rotation of a second intermediate gear 116 engaged with the first intermediate pinion shaft 112 and fixedly attached to an end of a second intermediate pinion shaft 118. The second intermediate pinion shaft 118 is aligned and supported for rotation by second intermediate bearing assemblies 120. The second bearing assemblies 114 may include a combination of ball bearings, needle roller bearings, or the like.

The first intermediate pinion shaft 112 and the first bearing assemblies 114 are positioned within a first wall 122a of an intermediate housing 122. The second intermediate pinion shaft 118 and the second bearing assemblies 120 are positioned within a second wall 122a of the intermediate housing 122. The second wall 122a includes a longitudinal opening 122c through which the second intermediate pinion shaft 118 engages a drive sub-assembly 150 described in more detail below with reference to FIGS. 2, 4A, and 4B.

The drive sub-assembly 150 is positioned between a first shaft housing 124 and a second shaft housing 126 of the drive system 100. Each of the first shaft housing 124 and the second shaft housing 126 defines a cylindrical wall that surrounds a portion of the output shaft 102 when installed in the drive system 100. The first shaft housing 124 is a tubular housing formed in, and extending from, the first housing 104a, and is closed by a cover 128 that includes a sensor 130 that detects a speed of the output shaft 102. In addition, the sensor 130 may detect a position (axial position) of the output shaft 102 within the first shaft housing 124. A thrust plate 132 for limiting axial movement of the output shaft 102 is attached to an end of the output shaft 102 positioned within the first shaft housing 124 proximate to the sensor 130.

The second shaft housing 126 may include a first outer surface 126a, a second outer surface 126b, and a third outer surface 126c. The first outer surface 126a may have an outer diameter less than an outer diameter of the second outer surface 126b, which may be less than outer diameter of the third outer surface 126c of the second shaft housing 126. An inner surface 126d of the second shaft housing 126 surrounds the output shaft 102. As illustrated in FIG. 1, the output shaft 102 extends through the second shaft housing 126 and out of the second housing 104a through bore 134 defined in a wall of the second housing 104a.

Figure 2:
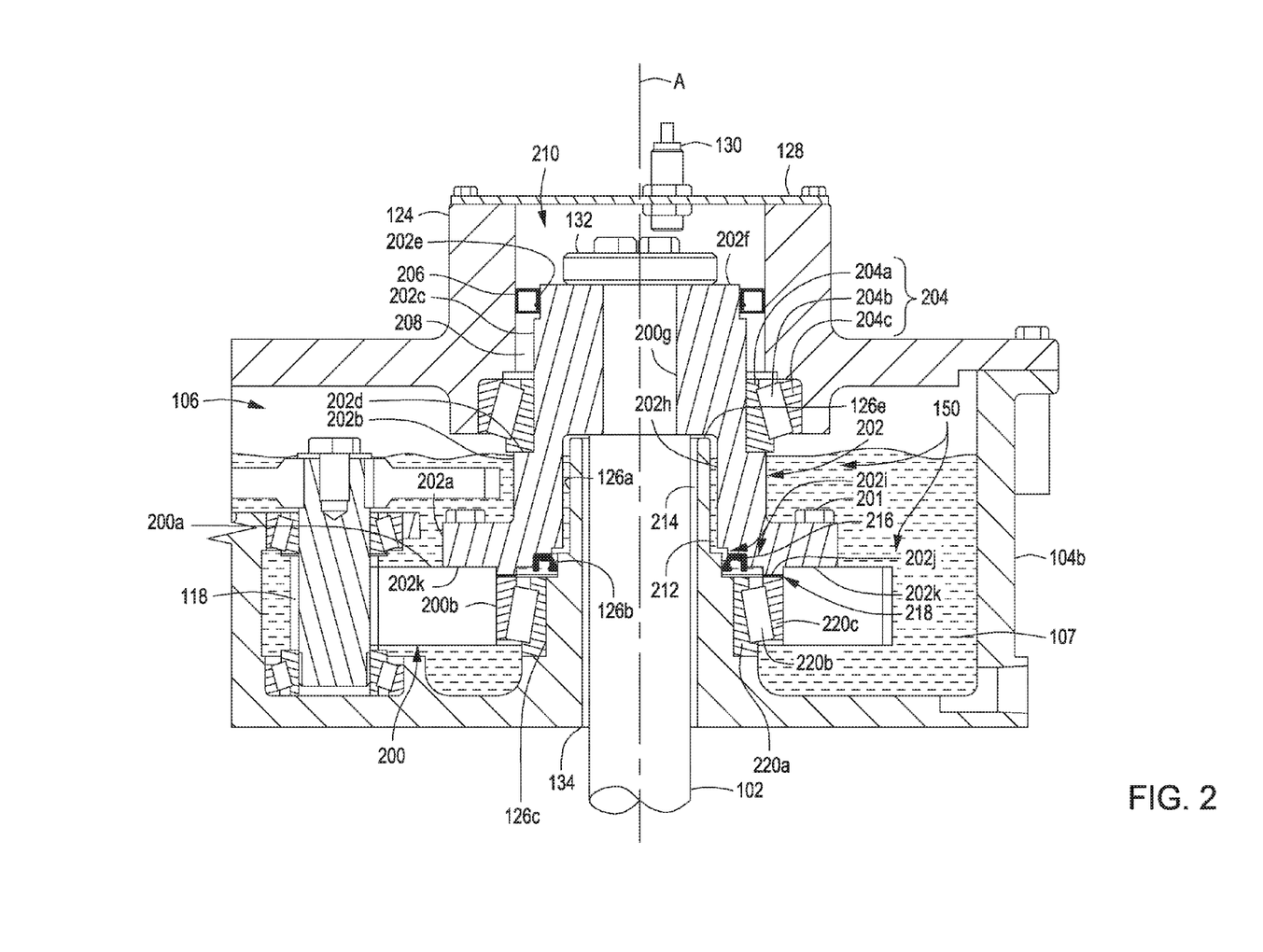
FIG. 2 is an enlarged view of a portion of FIG. 1 including a drive sub-assembly, according to an aspect of the present disclosure.

FIG. 2 is an enlarged view of a portion of FIG. 1 including the drive sub-assembly 150, according to an aspect of the present disclosure. The drive sub-assembly 150 includes an output gear 200 and a hub 202. As illustrated in FIG. 2, the second intermediate pinion shaft 118 is engaged with the output gear 200 which includes a mounting surface 200a on which the hub 202 is mounted. The hub 202 includes a base 202a, which defines a flange for receiving fasteners 201 for fixedly attaching the hub 202 to the gear 200. The fasteners 201 may include bolts, screws, or other types of fasteners known in the art capable of joining separate components. One of ordinary skill in the art will understand that in addition to the fasteners, or as an alternative to the fasteners, the base 202a of the hub 202 may be attached to the gear 202 by an adhesive material.

The hub 202 includes a body that extends from the base 202a and has an outer circumferential surface. Further, the outer circumferential surface includes a first outer circumferential surface 202b (hereafter referred to as "first hub outer surface 202b") and a second outer circumferential surface 202c (hereafter referred to as "second hub outer surface 202c"). As illustrated in FIG. 2, the first outer hub surface 202b extends from the base 202a, and the second outer hub surface 202c extends from the first hub outer surface 202b. A diameter of the first hub outer surface 202b is greater than a diameter of the second hub outer surface 202c so as to form a shoulder 202d on which a first output bearing assembly 204 may be mounted. The first output bearing assembly 204 may be a ball bearing, needle roller bearing, or equivalent bearing assembly.

According to an aspect of the present disclosure, the first output bearing assembly 204 includes a first inner race 204a, first rollers 204b, and a first outer race 204c. The entire first output bearing assembly 204 may be mounted on the hub 202. During installation of the driving assembly 150 in to the housing 104, the first outer race 204c, being mounted on to the hub 202 along with the first inner race 204a, is tightly fitted (e.g. friction fitted, interference fitted) and/or adhered to an inner surface of a portion of the first shaft housing 124. Alternatively, the first outer race 204c may be preinstalled in the first shaft housing 124. As such the first inner race 204a and first rollers 204b may be mounted on the hub 202, and the first rollers 204b engage the first outer race 204c when the hub 202 or drive sub-assembly 150 is positioned in the housing 104.

A hub outer recess 202e may be formed in the first hub outer surface 202b proximate to (e.g. at or near) a first end face 202f of the hub 202 that corresponds to the end of the output shaft 102 including the thrust plate 130. The first end face 202f is provided on an end of the hub 202 positioned within the first shaft housing 124. A first seal 206 may be positioned in the hub outer recess 202e to form a seal between the first shaft housing 124 and the hub 202. The first seal 206 separates a buffer zone 208 from a sub-chamber 210. The buffer zone 208 is defined by an inner surface of the first shaft housing 124 and second outer hub surface 202c. As illustrated in FIG. 2, the sub-chamber 210 is defined by the cover 128, the first end face 202f of the hub 202, and the first seal 206. The thrust plate 132 and a portion of the sensor 130 extending into the housing 104 are positioned in the sub-chamber 210. The first seal 206 prevents the fluid 107 that is provided in the operating chamber 106, and which lubricates the first output bearing assembly 204, from entering into the sub-chamber 210 and coming in contact with the thrust plate 132 and the output shaft 102.

At least the geared portion of the output gear 200, the first hub outer surface 202b, the second hub outer surface 202c, and the hub outer recess 202e define an outer portion of the drive sub-assembly 150. The outer portion may also include the first bearing assembly 204 or select components thereof. An inner portion of the drive sub-assembly 150 includes a first inner circumferential surface defined by the hub 202 with a first inner hub surface 202g, a second inner hub surface 202h, and an inner hub recess 202i; and a second inner circumferential surface defined by the output gear 200 with an inner gear surface 200b.

The first inner hub surface 202g may be a circumferential surface defining a bore configured to receive, and be in contact with, a portion of the output shaft 102. The second inner hub surface 202h may define a bore having a greater diameter than the bore defined by the first inner hub surface 202g. Further, the second inner hub surface 202h may surround the first outer surface 126a of the second shaft housing 126 and define a first gap 212 configured to be at least partially filled with the fluid 107. The first outer surface 126a of the second shaft housing 126 defines a wall between the first gap 212 and a second gap 214 defined by the output shaft 102 and the inner surface 126d of the second shaft housing 126.

According to one aspect of the present disclosure, the drive sub-assembly 150 may be positioned such that the first outer surface 126a extends vertically above a level of the fluid 107 within the first gap 212. According to another aspect of the present disclosure, an end face 126e of the second shaft housing 126 proximate to the first inner surface 126a may be spaced from a shoulder defined between the first inner hub surface 202g and the second inner hub surface 202h by a distance on the order of 1 to 2 mm. The first outer surface 126a extending above a fluid level and/or being in abutment with hub 202 will prevent the fluid 107 from flowing into the second gap 214. Accordingly, the first outer surface 126a extends vertically to provide a barrier (e.g. a drywell, oil dam, etc.) that prevents the fluid 107 in the first gap 212 from entering into the second gap 214 and coming into contact with the output shaft 102.

The inner hub recess 202i may be located proximate to (e.g. at or near) a second end face 202j of the hub 202, and include a series of stepped portions in which a second seal 216 is positioned. The second seal 216 may surround the second outer surface 126b located between first outer surface 126a and the third outer surface 126c along a longitudinal axis A of the hub 202. As illustrated in FIG. 2, the longitudinal axis A of the hub 202 coincides with a longitudinal axis (not designated) of the output shaft 102. The second seal 216 may limit the amount of fluid 107 that enters into the first gap 212 and thereby supplement a capability of the first outer surface 126a (e.g. drywell, oil dam, etc.) to prevent the fluid 107 from contacting the output shaft 102. Each of the first and second seals 206, 216 may be an O-ring, packing, labyrinth seal, gasket, or other sealing mechanism known in the art. The first and second seals 206, 216 may be formed from elastomeric materials (e.g. thermosets, thermoplastics, etc.), soft metals, or other materials known in the art for forming seals.

Figure 5:
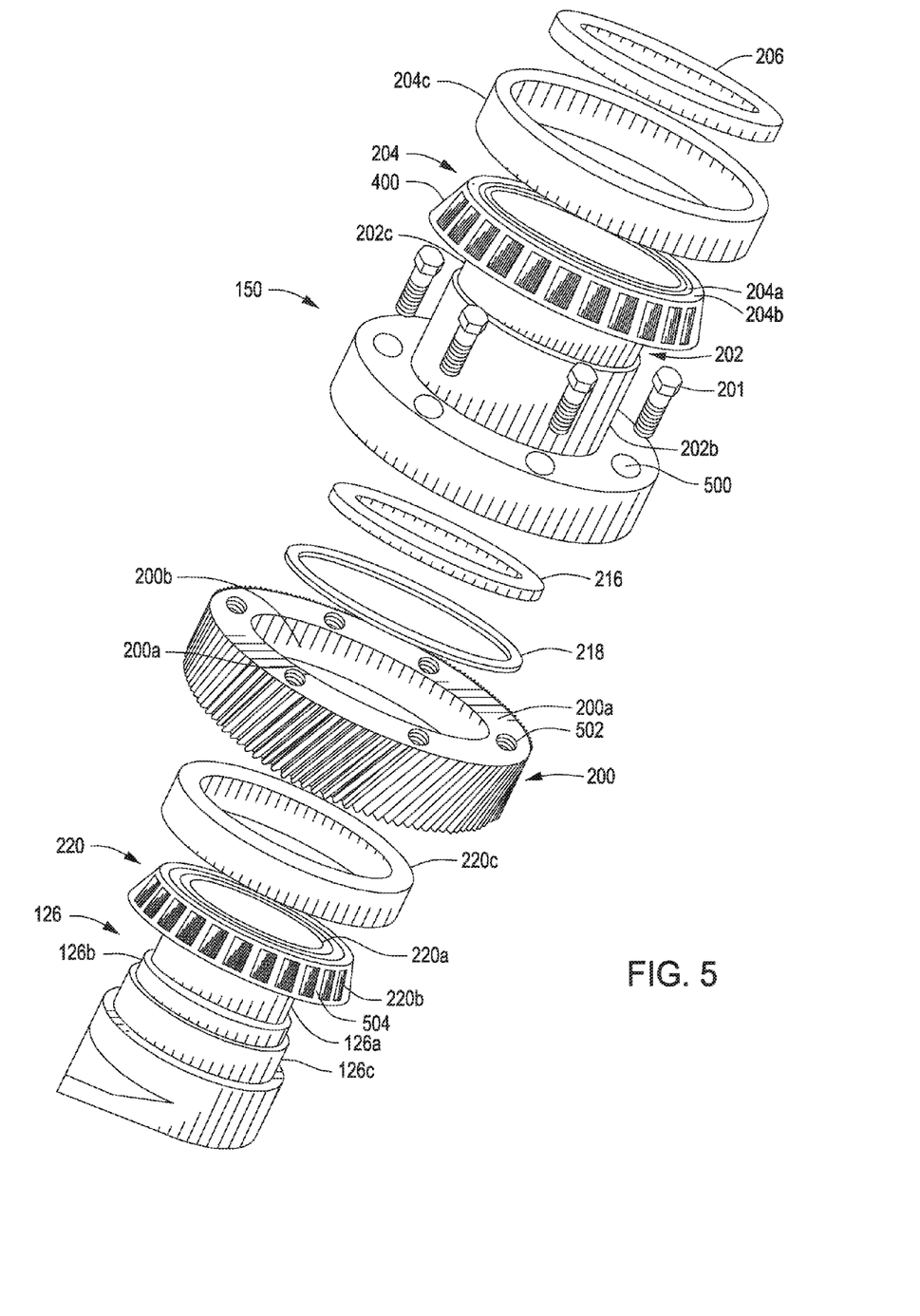
FIG. 5 illustrates an exploded view of a drive sub-assembly and a portion of a housing assembly, according to an aspect of the present disclosure.

As illustrated in FIG. 2, the second seal 216 may be positioned above a spacer 218 (e.g. a shim or packing) located between the second end face 202j of the hub 202 and a second output bearing assembly 220. According to an aspect of the present disclosure, the spacer 218 may be formed in the shape of a flat ring (FIG. 5). The second output bearing assembly 220 may include a second inner race 220a, second rollers 220b, and a second outer race 220c; and the spacer 218 may be positioned to have a surface of the flat ring be in abutment with the second outer race 220c. Thus, the spacer 218 may fill an area between the second end face 202j and the second output bearing assembly 220 and thereby perform a shimming operation. The spacer 218 may maintain the second outer race 220c in an optimal axial position relative to the second rollers 220b. As result, the spacer 218 may prevent movement along the longitudinal axis A, and thereby aid in the setting, of the second output bearing assembly 220.

The arrangement of the first seal 206 and the first outer surface 126a relative to the hub 202 facilitates lubrication of the first and second output bearing assemblies 204, 220 by the same lubricant (i.e. the fluid 107, which may, for example, be oil) provided within the operating chamber 106. Thus, different lubricants and different sources of lubricant do not need to be respectively employed within the drive system 100 to lubricate the first and second output bearing assemblies 204, 220. Accordingly, the drive sub-assembly 150 enables the first and second output bearing assemblies 204, 220 to be lubricated by the same type of lubricant, from the same lubricant source, while ensuring the lubricant does not come in contact with the output shaft 102. According to another aspect of the present disclosure, the first or second bearing assembles 204, 220 may be lubricated directly through conduits or other mechanisms dedicated to delivering the lubricant locally.

The second end face 202j of the hub 202 may include a stepped portion 202k that abuts the mounting surface 200a of the output gear 200. The stepped portion 202h may be shaped to receive a portion of the output gear 200 extending from a portion of the output gear 200 that surrounds the second output bearing assembly 220. The second output bearing assembly 220 may be a ball bearing, needle roller bearing, or equivalent bearing assembly. As discussed above, the second output bearing assembly 220 includes the second inner race 220a, the second rollers 220b, and the second outer race 220c. The second inner race 220a, second rollers 220b and the second outer race 220c may be mounted on to the second shaft housing 126 as a preassembled component. However, one of ordinary skill in the art will also understand that the second inner race 220a and the second rollers 220b may be mounted to the second shaft housing 126, with the second outer race 220c mounted thereon separately.

During assembly of the drive system 100, the second inner race 220a may be tightly fitted (e.g. friction fitted, interference fitted) and/or adhered on to the third outer surface 126c of the second shaft housing 126. Further, the output gear 200 by itself, or in combination with the hub 202, may be positioned around the second shaft housing 126 so that the inner gear surface 200b is mounted on the second outer race 220c. According to one aspect of the present disclosure, the second outer race 220c may be tightly fitted (e.g. friction fitted, interference fitted) and/or adhered on to the inner gear surface 200b of the output gear 200. According to another aspect of the present disclosure, the second inner race 220c may be fitted to the inner gear surface 200b of the output gear 200 to permit a degree of slippage between the output gear 200 and the second inner race 220c as the output gear 200 rotates during operation of the mixing apparatus 1.

According to another aspect of the present disclosure, the second outer race 220c may be pre-fitted on to the inner gear surface 200b of the output gear 200. The second outer race 220c may be mounted on to the second inner race 220a and the second rollers 220b at the same time the output gear 200 is mounted on to the second shaft housing 126. According to yet another aspect of the present disclosure, the entire second output bearing assembly 220 may be pre-mounted on to the inner gear surface 200b of the output gear 200. In either configuration the second outer race 220c may engage the second rollers 220b when the output gear 200 or assembled drive sub-assembly 150 is positioned on the second shaft housing 126

For each assembly scheme described above, the output gear 200 and the second output bearing assembly 220 are directly engaged. In particular, the inner gear surface 200b, which defines the second inner circumferential surface of the drive sub-assembly 150, is engaged with the second outer race 220c to provide a bearing bore that accommodates the second output bearing assembly 220. As a result, the motion of the output gear 200 is supported by the second output bearing assembly 220 without an additional component operatively positioned between the output gear 200 and the second output bearing assembly 220. Said another way, the rotational motion of the output gear 200 is facilitated by the second output bearing assembly 220 via a single interface between the output gear 200 and the second output bearing assembly 220.

The output gear 200 effectively serves as a bearing journal for the second output bearing assembly 220. As a result, the output gear 200 minimizes a number of interfaces between components that facilitate support of the rotational movement of the output gear 200 by the second output bearing assembly 220. Further, the direct engagement between the output gear 200 and the second output bearing assembly 220 may result in improved accuracy of rotation of the output gear 200 during operation of the mixing apparatus 1, as compared to other bearing and gear arrangements.

Other arrangements including a series of components inter-engaged between a gear and a bearing assembly will include an interface at each inter-engagement between the components. For example, a gear mounted on a shaft or hub that is directly supported by, and engaged with, a bearing assembly includes at least two interfaces; one interface between the gear and the shaft, and another interface between the shaft and the bearing. In these other arrangements, the motion of the gear may be transmitted in a different manner by each component and at each interface. Thus, different loads orientated along different directions may oppose the rotational motion of the gear and/or bearing. Such loads can cause the gear or bearing to deviate from a respective axial and/or radial position relative to a respective rotational axis and reduce rotational accuracy.

In contrast to these other arrangements, the output gear 200 and the second output bearing assembly 220 are directly engaged as discussed above. Thus, a number of interfaces that may potentially be capable of causing the output gear 200 and/or the output bearing assembly 220 to deviate from an axial or radial position during operation, is reduced to one. As a result, the accuracy of the rotation of the output gear 200 of the present disclosure may be improved with respect to other arrangements that include multiple interfaces between a gear and a bearing assembly.

During operation of the mixing apparatus 1, the output gear 200 rotates and effects a rotation of the output shaft 102. The rotation of output shaft 102 and the output gear 200 is supported by the second output bearing assembly 220. The output gear 200 is concentric with the second output bearing assembly 220 making for more accurate rotation of the output gear 200 with less gear runout. A decrease in gear runout means noise and vibrations that may be generated with the rotation of the output gear 200 are reduced. Further, The mixing apparatus 1 may also run cooler. In addition, by improving the accuracy of rotation of the output gear 200, the arrangement of the drive sub-assembly 150 may improve accuracy and performance of the drive system 100 with respect to the rotation of the output shaft 102.

The drive system 100 according to the present disclosure may provide other advantages.

For example, the output gear 200 of the drive sub-assembly 150 sets the second output bearing assembly 220. Thus, the output gear 200 limits/allows there to be an amount of axial clearance between bearing rollers and races, and/or limits/allows an amount of axial interference (preload) between bearing rollers and races; or more generally limits/allows an amount of axial movement permitted by the bearing rollers. Setting the second output bearing assembly 220 with the output gear 200 may provide improved performance and accuracy in the operation of the second output bearing assembly 220, and thus the output shaft 102, as compared to a bearing assembly that is set by a bearing cap. It will also be understood that the first shaft housing 124 limits the axial movement of first rollers 204b and the first outer race 204c via the engagement of the first outer race 204c and an inner surface of the first shaft housing 124, and via the engagement of the first outer race 204c with the first rollers 204a. Accordingly, the output gear 200 and the first shaft housing 124 each perform a similar function as, and therefore eliminate a need for, a bearing cap that could be used to set either of the first or second output bearing assemblies 204, 220.

Another example of an advantage of the drive system 100 of the present disclosure is a reduction in parts needed to provide the drive system 100. By arranging the output gear 200 to be directly attached to the hub 202 and directly engaged with the second output bearing assembly 220, the output gear 200 functions as a gear and a bearing bore for the second output bearing assembly 220. Further, the second shaft housing 126, as single structure, effectively performs the function of a drywell and a bearing cap. Thus, a total number of parts for the drive system 100 may be less than other arrangements that may include, for example, more than one interface between a gear and a bearing assembly and/or bearing caps. The reduced number of parts may improve time and ease of assembly for the drive system 100.

Figure 3:
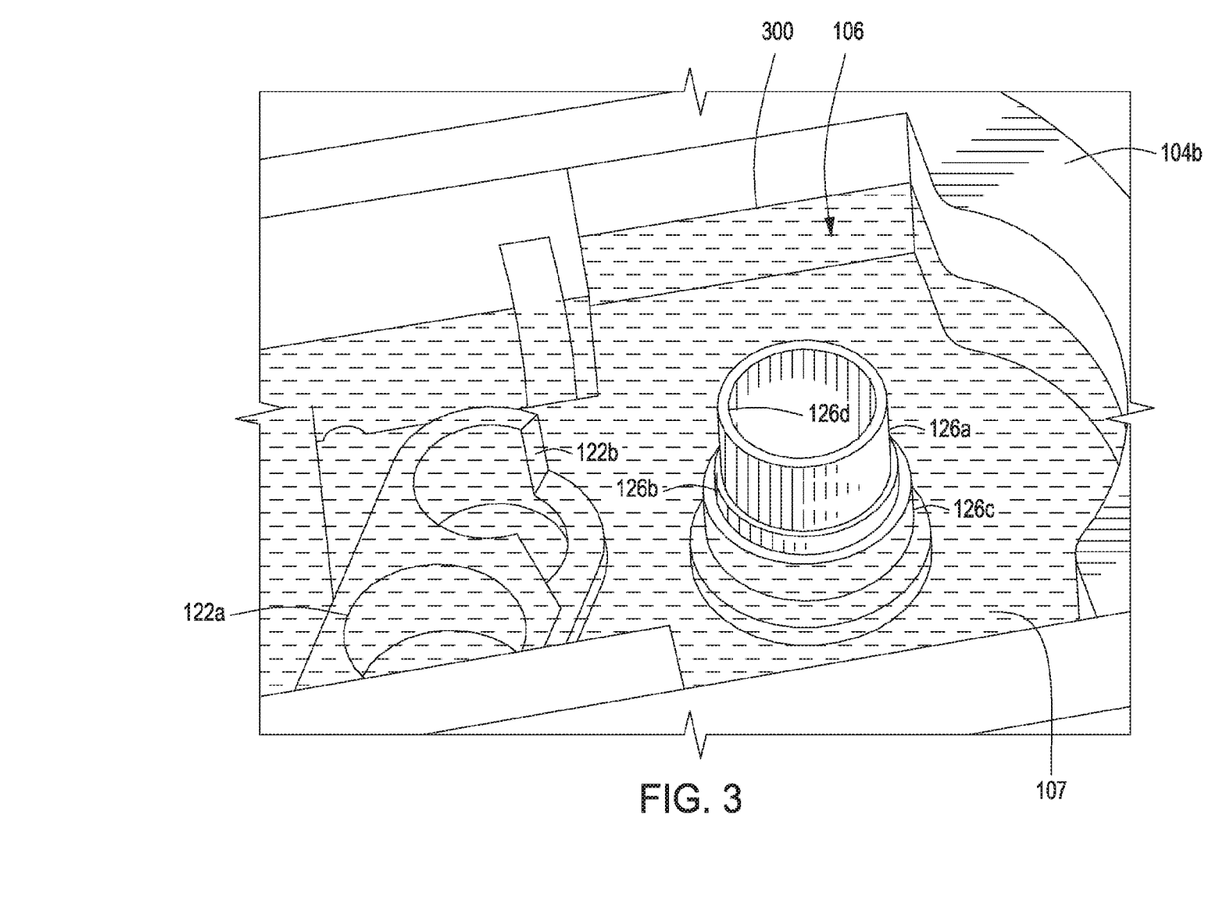
FIG. 3 illustrates a perspective view of a second housing for a housing assembly, according to an aspect of the present disclosure.

FIG. 3 illustrates a perspective view of the second housing 104b for the housing assembly 104, according to an aspect of the present disclosure. As illustrated in FIG. 3, the operating chamber 106 is filled with the fluid 107. A volume of the fluid 107 provided in the operating chamber 106 may be such that a fluid level 300 is lower than the end face 126e of the second shaft housing 126 with the drive sub-assembly 150 and the first and second gear, pinion, and bearing assemblies positioned within the housing assembly 104.

Figure 4A:
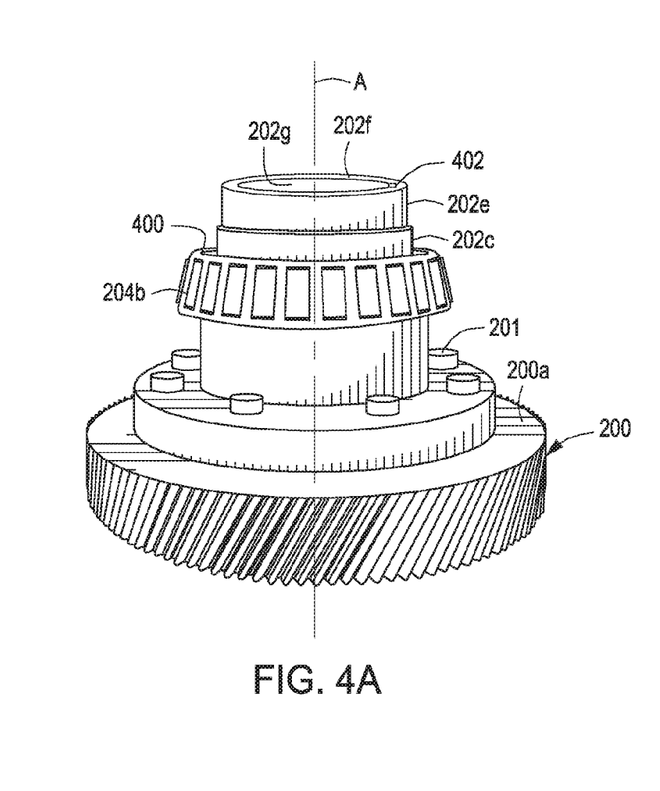
FIG. 4A illustrates a front perspective view of a drive sub-assembly, according to an aspect of the present disclosure.
Figure 4B:
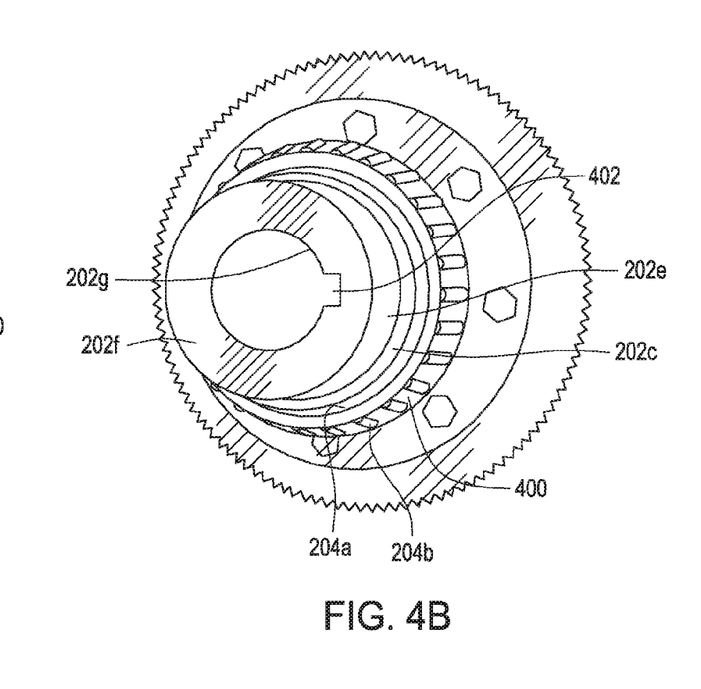
FIG. 4B illustrates an overhead perspective view of a drive sub-assembly, according to an aspect of the present disclosure.

FIGS. 4A and 4B respectively illustrate front and overhead perspective views of the drive sub-assembly 150, according to aspects of the present disclosure. The drive sub-assembly 150 may be assembled into a single part that may be installed in the drive system 100, as well as removed from the drive system 100 and replaced. As illustrated FIGS. 4A and 4B, the drive sub-assembly 150 may include the gear 200, the hub 202, and the first inner race 204a and first rollers 204b of the first output bearing assembly 204 assembled into the single part to be installed in the drive system 100, according to an aspect of the present disclosure. The first output bearing assembly 204 includes a first cage or separator 400 which holds the first rollers 204b.

As illustrated in FIG. 4B, a key recess 402 may be formed in the first inner hub surface 202g along the longitudinal axis A. The key recess 402 may extend along the first inner hub surface 202g for a portion of the hub 202 corresponding to the second outer hub surface 202c and the hub outer recess 202e. According to an aspect of the present disclosure, the key recess 402 may also extend over a portion of the second inner hub surface 202h. The key recess 402 may extend to the first end face 202f of the hub 202 as illustrated in FIGS. 4A and 4B, or stop short of the first end face 202f. The key recess 402 may correspond to a shape of a keyed portion (not shown) of the output shaft 102. The keyed portion of the output shaft 102 may fit into the key recess 402 and operatively engage (e.g. lock) the hub 202 with the output shaft 102, so that rotational movement of the output gear 200 and the hub 202 is transmitted to the output shaft 102 (i.e. torque is transferred to output shaft and drives the rotational movement).

It will be understood that various configurations including a key recess and a keyed portion may be used with a keyed recess formed in an outer surface of the output shaft 102 and a keyed portion extending from the first and/or second inner hub surfaces 202g, 202h. It will also be understood that other arrangements and mechanisms may be employed to operatively engage the hub 202 with the output shaft 102 without increasing the potential for lubricant to contact the output shaft 102. For example, other arrangements and mechanisms may include multiple keyed recesses and keyed portions, splines, locking pins (preferably positioned above the first seal 206), set screws, and the like, or friction fit arrangements.

According to another aspect of the present disclosure, the drive sub-assembly 150 of FIGS. 4A and 4B may include one more components not shown including the second seal 216, the spacer 218, and one or more components of the second output bearing assembly 206. With reference to FIG. 2, the drive sub-assembly 150 of FIGS. 4A and 4B as the single assembled part may include the second seal 216 positioned within inner hub recess 202i, and the spacer 218 positioned between second end face 202j and the second outer race 220c which is fitted to the inner gear surface 200b. As illustrated in FIG. 2, the inner gear surface 200b may overlap at least a portion of the second end face 202j, the second outer race 220c, and the spacer 218 along the longitudinal axis A.

It will be understood that spacers of different annular dimensions may be provided for the spacer 218 according the present disclosure. As a result, the spacer 218 as applied in the drive sub-assembly 150 of FIGS. 4A and 4B may extend over different portions of a radial space between the inner gear surface 200b and the second outer surface 126b of the second shaft housing 126. According to an aspect of the present disclosure, the spacer 218 may cover a portion (but not an entirety) of the radial space discussed above, and hold the second seal 216 within the inner hub recess 202i when the drive sub-assembly 150 is not installed in the drive system 100.

FIG. 5 illustrates an exploded view of the drive sub-assembly 150 and a portion of the housing assembly 104 including the second shaft housing 126, according to an aspect of the present disclosure. According to an aspect of the present disclosure, in providing the drive system 100, the second seal 216 may be placed in the inner hub recess 202i and the spacer 218 may be placed inwardly of the mounting surface 200a and between at least the second outer race 220c and the second end face 202j (FIG. 2) of the hub 202. The hub 202 may be attached to the output gear 200 by the fasteners 201 which extend through first bores 500 formed in the hub 202 and second bores 502 formed in the gear 200. Where the fasteners 201 are threaded, at least the second bores 502 may include corresponding threaded surfaces to receive and secure the fasteners 201 in order to secure the gear 200 to the hub 202. Prior to or after the gear 200 being attached to the hub 202, at least the first inner race 204a, first rollers 204b, first cage or separator 400, and first outer race 204c may be mounted to the second hub outer surface 202c/shoulder 202d.

As can be seen from FIG. 5, the second inner race 220a, the second rollers 220b, and a second cage or separator 504 which holds the second rollers 220b, may be mounted to the third outer surface 126c of the second shaft housing 126. According to an aspect of the present disclosure, the output gear 200 may be positioned on the second shaft housing 126, and the hub 202 may be subsequently attached to the output gear 200. According to another aspect of the present disclosure, the assembled drive sub-assembly 150 including the output gear 200 and the hub 202 may be mounted on the second shaft housing 126. With either assembly scheme, the second outer race 220c may be mounted on the second shaft housing 126 or pre-fitted on to the inner gear surface 200b. Thus, during assembly the second outer race 220c may engage the inner gear surface 200b, or the second rollers 220b may engage the second outer race 220c located on the inner gear surface 200b, when the output gear 200 is mounted on to the second shaft housing 126. It will be understood that the first inner race 204a, the first rollers 204b, and first cage or separator 400 may be positioned on the hub 200 before or after the hub 202 and the output gear 200 (including at least the second outer race 220c) are positioned on the second shaft housing 126, which may then be followed by the placement of the first seal 206 around the hub outer recess 202e.

Further aspects of the drive system 100 will be described with reference to FIGS. 1-4. Following a positioning of the first seal 206, the first housing 104a may be mounted on the second housing 104b by aligning an opening defined by the first shaft housing 124 with the hub 202 of the drive sub-assembly 150 as illustrated in FIGS. 1 and 2. As the first housing 104a is located on to the second housing 104b, the first outer race 204c may be fitted to an inner surface of the first housing 104a corresponding to the second outer surface 202c. In an arrangement in which the first outer race 204c is pre-fitted to the first housing 104a, the first outer race 204c will engage the first rollers 204b, and the first seal 206 will engage an inner surface of the first shaft housing 124 as illustrated in FIG. 2. The output shaft 102 may be inserted through the bore 134 and passage defined by the inner surface 126d of the second shaft housing 126 and the first inner hub surface 202g, thereby engaging the key recess 402 of the hub 202 illustrated in FIG. 4B. The thrust plate 132 illustrated in FIGS. 1 and 2, may be secured to the end of the output shaft 102 via bolts or other fasteners causing the output shaft 102 to be held in place within the drive system 100. Subsequent to the securement of the thrust plate 132, the cover 128 may be fixed on to the first shaft housing 124, and the fluid 107 provided in the operating chamber 106.

Figure 6:
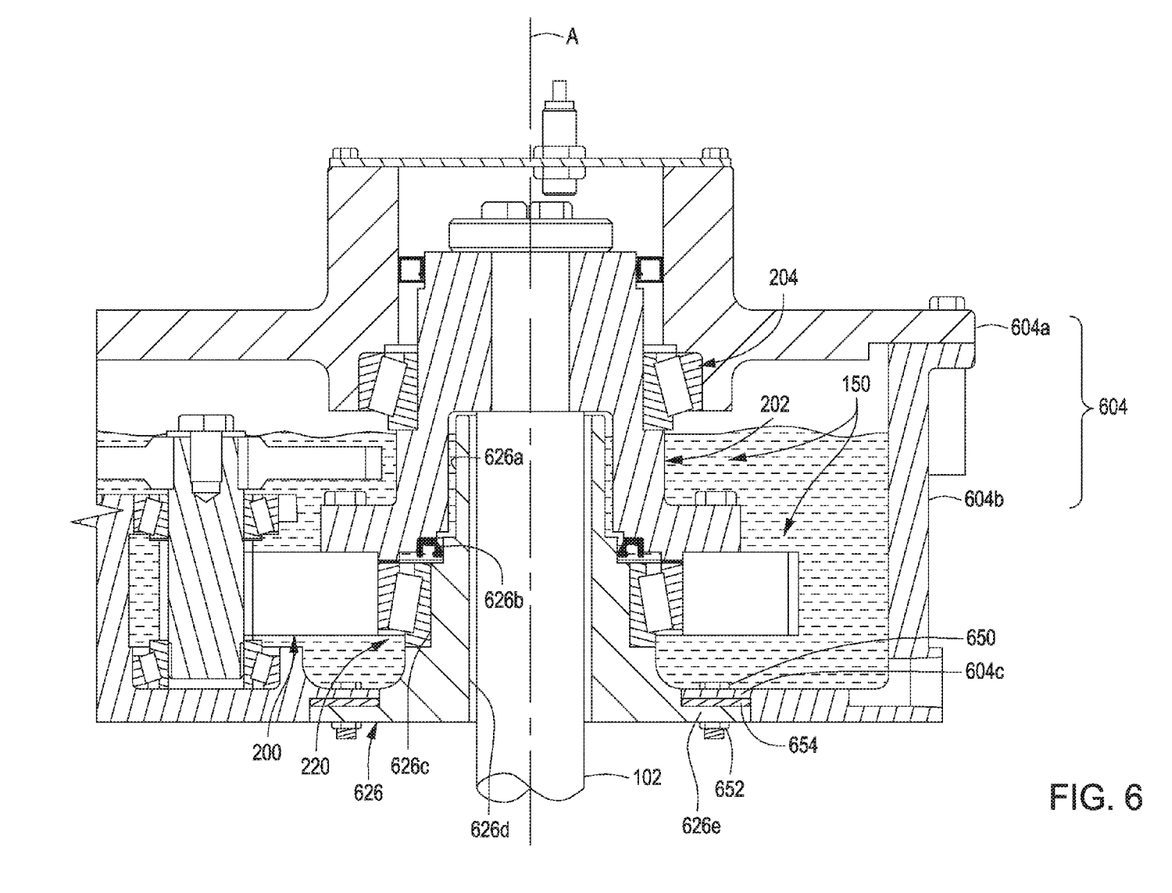
FIG. 6 illustrates a partial cross-sectional view of a housing assembly, according to an aspect of the present disclosure.

FIG. 6 illustrates a partial cross-sectional view of a housing assembly 604, according to an aspect of the present disclosure. The housing assembly 604 includes a first housing 604a mounted to a second housing 604b. The second housing 604b includes a first flange 604c to which a removable shaft housing 626 may be attached. The removable shaft housing 626 includes a first outer surface 626a, a second outer surface 626b, a third outer surface 626c, and an inner surface 626d which preform the same functions as the corresponding elements of the second shaft housing 126 illustrated in FIGS. 1-3 and 5. In addition, the removable shaft housing 626 includes a second flange 626e corresponding to the first flange 604c. The removable shaft housing 626 is attached to the second housing 604b via bolts 650 extending through bores (not shown) provided in the first flange 604c and the second flange 626e, and a shim or gasket 654 positioned between the first and second flanges 604c, 626e. The bolts 650 are secured by respective nuts 652. According to an aspect of the present disclosure, the assembled drive-subassembly 150, the first bearing assembly 204, and the second bearing assembly 220 may be mounted onto the removable shaft housing 626 and installed as one assembly into the housing assembly 604.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A drive sub-assembly for driving a shaft, the drive sub-assembly comprising:
   a hub extending from a first end face to a second end face along a longitudinal axis, the hub having an outer circumferential surface arranged to engage a first bearing assembly and a first inner circumferential surface arranged to engage an output shaft, the first bearing assembly comprising a first inner race, first rollers, and a first outer race;
   a second bearing assembly comprising a second inner race, second rollers, and a second outer race;
   a gear attached to the second end face of the hub, the gear having a second inner circumferential surface that is arranged to directly engage the second outer race; and
   a housing assembly, wherein the outer circumferential surface defines:
   a first recess proximate to the first end face; and
   a shoulder between the first recess and the second end face along the longitudinal axis, wherein the first inner race and the first rollers are mounted on the shoulder, wherein the first outer race and second inner race are attached to said housing assembly, and wherein the first inner circumferential surface defines a second recess proximate to the second end face.

2. The drive sub-assembly of claim 1,
   wherein the second end face is formed on a base of the hub that is positioned on a mounting surface of the gear and defines at least a first bore and a second bore,
   wherein the gear defines at least a third bore corresponding to the first bore and a fourth bore corresponding to the second bore, and
   wherein the first bore, the second bore, the third bore, and the fourth bore receive fasteners to fixedly attach the gear to the hub.

3. The drive sub-assembly of claim 1,
wherein the second inner circumferential surface is arranged to directly engage an outer race of the second bearing assembly.

4. The drive sub-assembly of claim 3,
wherein the second end face is arranged to contact a spacer to be positioned between the outer race and the second end face,
wherein the first inner circumferential surface defines a recess radially inward of a portion of the second end face arranged to contact the spacer, and
wherein the recess is arranged to receive a seal.

5. The drive sub-assembly of claim 1,
wherein the drive sub-assembly includes an outer race of the second bearing assembly, and
wherein the outer race is fitted to the second inner circumferential surface.

6. The drive sub-assembly of claim 5,
further comprising a spacer positioned between the outer race and the second end face of the hub.

* * * * *